May 16, 1933. F. L. SCOTT ET AL 1,909,128
ROLLER CUTTER AND LUBRICATOR THEREFOR
Original Filed Feb. 16, 1931
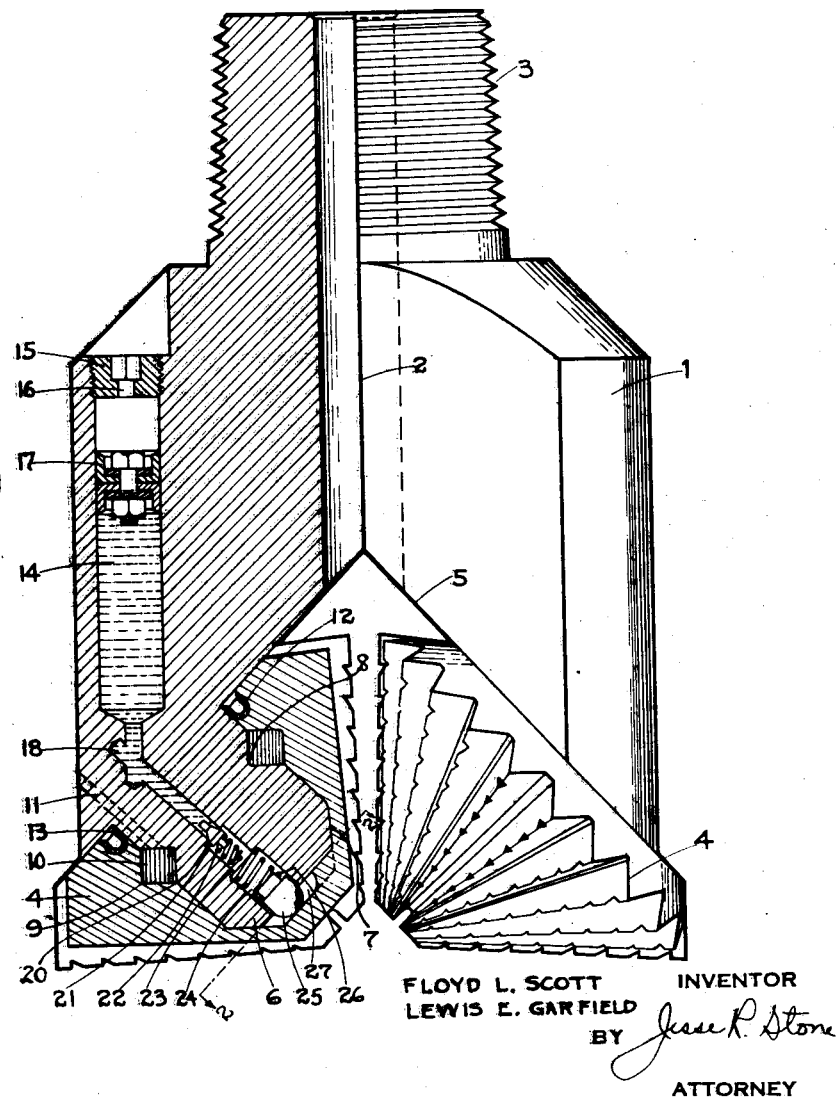
FLOYD L. SCOTT
LEWIS E. GARFIELD
BY Jesse R. Stone
ATTORNEY
INVENTOR Patented May 16, 1933

1,909,128

UNITED STATES PATENT OFFICE

FLOYD L. SCOTT AND LEWIS E. GARFIELD, OF HOUSTON, TEXAS, ASSIGNORS TO HUGHES TOOL COMPANY, OF HOUSTON, TEXAS, A CORPORATION OF TEXAS

ROLLER CUTTER AND LUBRICATOR THEREFOR

Original application filed February 16, 1931, Serial No. 515,946. Divided and this application filed February 1, 1932. Serial No. 590,010.

Our invention relates to roller cutters for deep well drill bits and includes a means to lubricate the same.

It is an object of the invention to provide a lubricator for the bearings of the cutters which will be automatically operated through the rotation of the cutters to feed the lubricant to the bearings.

It is another object to provide a lubricator which may be contained within the head of the drill and arranged so that the fluid pressure thereon is balanced.

It is another object to provide a means to prevent a loss of lubricant from the bearings during the operation of the drill.

We contemplate a provision of a means to feed the lubricant from the lubricator to the bearings which will tend to feed a uniform supply of lubricant to the bearings and operate it only while the drill is rotating.

In the drawing herewith Fig. 1 illustrates a side view partly in elevation and partly in central longitudinal section, illustrating a drill bit equipped with our invention. Fig. 2 is a transverse section on the plane 2—2 of Fig. 1.

This application is a division of our co-pending application No. 515,946 filed February 16, 1931.

We have shown the invention as adapted for use partly with the so-called cone bit. Said bit includes a head 1 longitudinally divided along the plane 2 and having an upper threaded shank 3 for attachment to the drill collar or drill stem. Each of the halves of the bit is provided with a rotatable cutter 4 mounted on an inner beveled face 5 of the head.

The cutters are formed to surround the end of a downwardly inclined shaft 6 formed integral with the head and extending at approximately right angles to the beveled inner face 5 of the head. This shaft is approximately cylindrical in shape but is tapered slightly at 7, the forward end being truncated to form a flat surface. Between the ends of the shaft is formed a groove 8 which is approximately V-shaped and extends circumferentially about the shaft.

The cutter 4 is formed with a central recess shaped to closely engage about the end of the shaft and enclose the same. It has a V-shaped slot 9 registering with the groove 8 in the shaft to receive a retaining ring 10. Said ring is approximately rectangular in cross section and made of fusible metal adapted to be poured into position while in molten state through a passage indicated at 11 in dotted lines. At the base of the cutter we provide a groove 12 on the inner side thereof to receive a packing ring 13, which is adapted to seal the cutter about the base of the shaft and prevent the entrance of fluid to the bearing from the outside.

The lubricator which we provide includes a chamber 14 formed in the head of the drill and of sufficient capacity to provide lubricant for one run of the drill in the well. Said chamber is cylindrical in shape and has an outer plug 15 therein to close the outer end of the chamber, except for a passage 16 through said plug to allow the static pressure of liquid in the well to be exerted on the lubricant. We provide a piston 17 in said compartment which is adapted to rest upon the upper side of the lubricant and to be forced against the lubricant by the fluid pressure in the well.

A passage 18 is formed in the head of the drill leading downwardly in an inclined direction longitudinally of the shaft 6. Within the shaft, the passage is enlarged at 20 to provide a valve chamber for a valve 21 which is adapted to close the passage 18 through the action of a spring 22 bearing at its outer end against a transverse pin 23. The valve chamber leads to an outer chamber 24 of somewhat larger diameter within which a plunger 25 is fitted. Said plunger is rounded at its outer end and is held outwardly through the action of a spring 26.

The rounded end of the plunger 25 extends into a recess 27 on the inner side of the cutter. Said recess 27 is best seen in Fig. 2. It is approximately circular but has at one side an inwardly extending cam 28 which is adapted to contact with the rounded end of the plunger 25 around which it rotates. From Fig. 1 it will be seen that the plunger is offset slightly to one side of the axis of the shaft 6. It will therefore be engaged by the cam 28 and moved inwardly against the action of the spring at each rotation of the cutter.

The operation of the lubricator will now be understood. The plunger 25 has a slight clearance within the recess within which it is fitted, so that lubricant can be forced around the plunger into the cutter. When the plunger 25 is moved inwardly, it will compress the spring 26 and lubricant within the recess 24 will be squeezed outwardly about the plunger into the recess 27 in the cutter. When the cam 28 has moved past the plunger, the spring will force it outwardly again, and this action will tend to draw more lubricant from the lubricator chamber 14 past the valve 21 into the space behind the plunger. We contemplate a heavy type of lubricant will be used and best results have been obtained with this form of lubricant. The grease will thus be forced outwardly around into the bearings between the shaft 6 and the cutter, and when the space about the bearings has been thus filled with lubricant it will exert a back pressure against the valve 21, which will tend to prevent feeding of more lubricant to the bearings where the supply is already sufficient.

The operation of the lubricator will be practically unaffected by the pressure of the liquid in the hole. The fluid pressure tending to enter around the base of the cutter to the bearings will be balanced by the pressure of the liquid on the piston 17, and the lubricant will thus tend to be fed to the bearings only through the pumping action of the plunger 25.

What we claim as new is:

1. A drill bit including a head, a cutter shaft thereon, a cutter surrounding one end of said shaft and rotatable on said shaft as a bearing, a lubricant container in said head, a passage therefrom to said bearing, and reciprocating pumping means in said passage operative through the rotation of said cutter to feed lubricant to said bearing.

2. A drill bit including a head, a cutter shaft thereon, a cutter surrounding one end of said shaft and rotatable on said shaft as a bearing, a lubricant container in said head, a passage therefrom to said bearing, a chamber connected therewith in said shaft, a plunger in said chamber, and means on said cutter engaging said plunger to reciprocate the same and pump lubricant to said bearing.

3. A drill bit including a head, a cutter shaft thereon, a cutter surrounding one end of said shaft and rotatable on said shaft as a bearing, a lubricant container in said head, a passage therefrom to said bearing, a chamber connected therewith in said shaft, a valve in said chamber normally closing said passage, a plunger on the downstream side of said valve, and means on said cutter engaging said plunger to reciprocate the same and pump lubricant past said valve to said bearing.

4. A drill bit including a head, a cutter shaft thereon, a cutter surrounding one end of said shaft and rotatable on said shaft as a bearing, a lubricant container in said head, a passage therefrom to said bearing, a chamber in said passage, a pump in said chamber including a plunger and a cam on said cutter engaging said plunger to reciprocate the same in the rotation of said cutter.

5. A drill bit including a head, a shaft integral therewith, a cutter rotatable on said shaft and surrounding the forward end thereof, a lubricant container, a passage connected therewith extending axially of said shaft to the bearings for said cutter, means in said passage to feed lubricant to said bearings including a plunger, a rounded forward end thereon, and a cam on said cutter engaging said rounded end on each rotation of said cutter, and means to balance the fluid pressure in said container.

In testimony whereof, we hereunto affix our signatures, this the 8th day of January, A. D. 1932.

FLOYD L. SCOTT.
LEWIS E. GARFIELD.